US012341385B2

(12) United States Patent
Bach

(10) Patent No.: US 12,341,385 B2
(45) Date of Patent: Jun. 24, 2025

(54) ROTARY ELECTRICAL MACHINE WITH REMOTE POSITION SENSOR

(71) Applicant: BorgWarner Inc., Auburn Hills, MI (US)

(72) Inventor: James C. Bach, Westfield, IN (US)

(73) Assignee: BorgWarner Inc., Auburn Hills, MI (US)

(*) Notice: Subject to any disclaimer, the term of this patent is extended or adjusted under 35 U.S.C. 154(b) by 417 days.

(21) Appl. No.: 17/876,826

(22) Filed: Jul. 29, 2022

(65) Prior Publication Data

US 2024/0039372 A1 Feb. 1, 2024

(51) Int. Cl.
*H02K 11/33* (2016.01)
*G01B 7/30* (2006.01)
*G01D 5/14* (2006.01)
*H02K 11/215* (2016.01)
*H02K 11/25* (2016.01)
*H02K 11/27* (2016.01)

(52) U.S. Cl.
CPC ............ *H02K 11/33* (2016.01); *G01B 7/30* (2013.01); *G01D 5/145* (2013.01); *H02K 11/215* (2016.01); *H02K 11/25* (2016.01); *H02K 11/27* (2016.01); *H02K 2211/03* (2013.01)

(58) Field of Classification Search
CPC ........ H02K 11/21; H02K 11/15; H02K 11/25; H02K 11/27; H02K 11/33; G01D 5/145
See application file for complete search history.

(56) References Cited

U.S. PATENT DOCUMENTS

| 10,190,561 | B1* | 1/2019 | Hao | H02P 3/12 |
| 2016/0336837 | A1* | 11/2016 | Ohnishi | H02K 11/215 |
| 2017/0294805 | A1* | 10/2017 | Remillard | H04N 21/41265 |
| 2020/0200234 | A1* | 6/2020 | Kinjo | F16C 19/06 |
| 2020/0284623 | A1* | 9/2020 | Ausserlechner | G01D 5/14 |
| 2021/0194316 | A1* | 6/2021 | Sprague | H02K 7/14 |
| 2022/0200398 | A1* | 6/2022 | Fukunaga | H01R 13/52 |
| 2022/0209629 | A1* | 6/2022 | Bach | H02K 21/14 |
| 2023/0098523 | A1* | 3/2023 | Sasongko | H02K 11/30 322/44 |

FOREIGN PATENT DOCUMENTS

WO WO-2021213744 A1 * 10/2021

* cited by examiner

*Primary Examiner* — Jeremy A Luks
(74) *Attorney, Agent, or Firm* — Reising Ethington P.C.

(57) ABSTRACT

A rotating electric machine includes a shaft angle sensor communicating with an external controller via differential signaling. This construction permits the controller to be located away from the axial end of the motor while reliably transmitting rotor angle or speed information to the controller over a relatively long electrical harness. The shaft angle sensor is mounted on a sensor board carried by the machine casing at the non-drive end of the rotor shaft. The sensor board can optionally act as a hub at which signals from multiple machine sensors are gathered to be placed in communication with the controller via the same electrical harness used to transmit the sensor information.

20 Claims, 5 Drawing Sheets

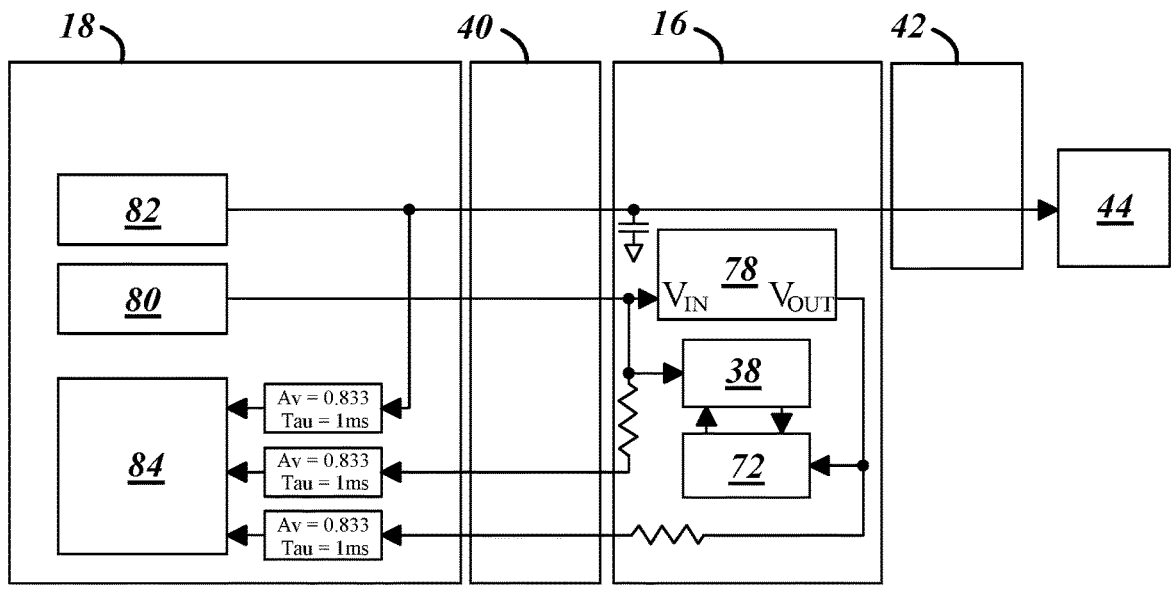
FIG. 7
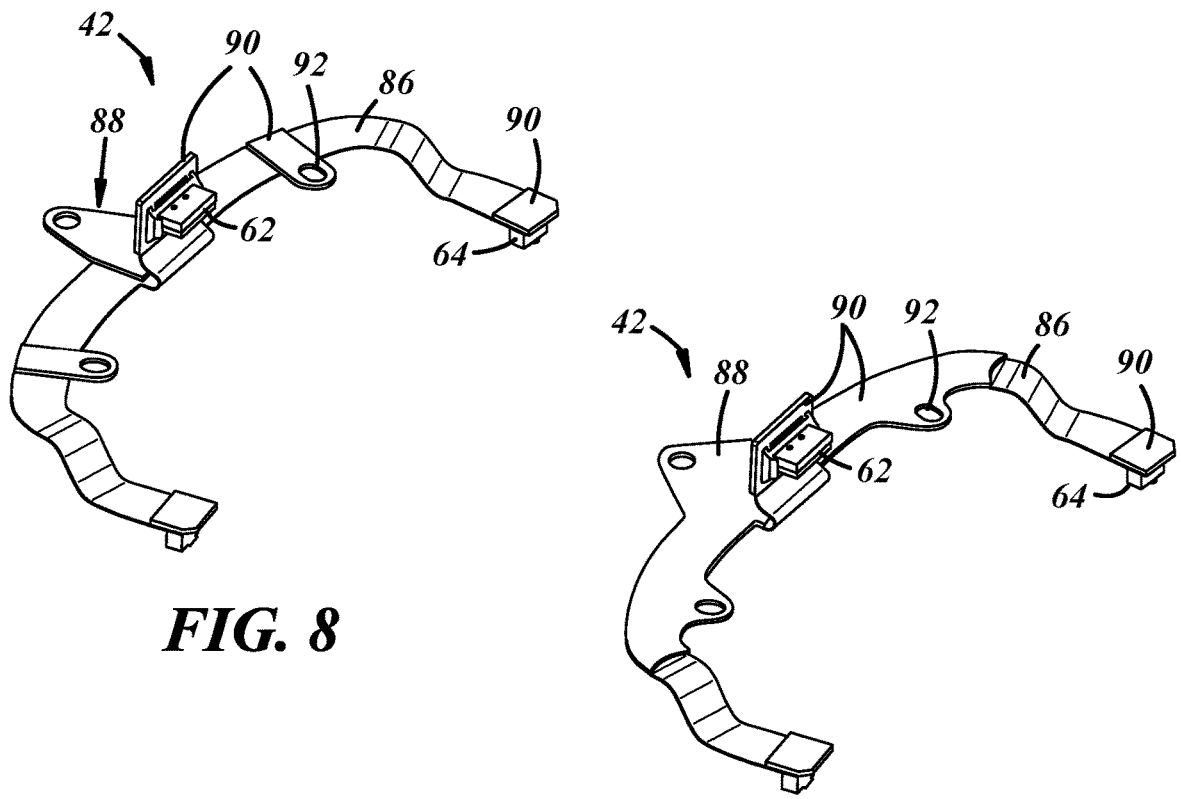
FIG. 8
FIG. 9

ROTARY ELECTRICAL MACHINE WITH REMOTE POSITION SENSOR

TECHNICAL FIELD

The present application relates to rotating electric machines and related sensors and systems.

BACKGROUND

Shaft angle sensors can be used to provide real-time information indicative of the angular position of the output shaft of an electric motor, which is useful for determining the angular speed of the motor and the relative position of the rotor with respect to the stator at any given time. In electric and hybrid vehicles, drive motors are often paired with an inverter to convert DC power, typically supplied by one or more batteries, to AC power or otherwise modulate electric power between the power source and motor. Shaft angle sensors are often mounted on the inverter control board which is then positioned at the non-drive end of the motor shaft proximate to some form of sensor target (e.g. magnet, toothed wheel/disc, etc.). But in some applications, there is not sufficient axial packaging space, requiring the inverter to be located away from the end of the motor and leading to problems associated with the reliable transfer of angular position data to the control board.

SUMMARY

In one implementation, an electronically controlled electric machine includes a rotating electric machine, a sensor target, a sensor board, a machine control board, and an electrical harness. The rotating electric machine includes a casing and a rotor shaft rotatably supported by the casing. The rotor shaft has a drive end and an opposite end on which the sensor target is mounted. The sensor board is supported by the casing and includes a shaft angle sensor positioned at the opposite end of the rotor shaft. The shaft angle sensor is configured to generate an electrical signal in response to movement of the sensor target relative to the shaft angle sensor. The machine control board is located outside the casing and includes a controller. The electrical harness interconnects the sensor board and the machine control board and transmits, from the sensor board to the machine control board, a differential pair of electrical signals corresponding to the electrical signal generated by the shaft angle sensor.

In some implementations, the electronically controlled electric machine includes an inverter that includes the machine control board. The inverter includes power modules in communication with the controller to modulate phase voltages supplied to the rotating electric machine based in part on the electrical signal generated by the shaft angle sensor.

In some implementations, the sensor board includes a transmitter that converts the electrical signal generated by the shaft angle sensor from a single-ended electrical signal to the differential pair of electrical signals, and the machine control board includes a receiver that converts the received differential pair of electrical signals to a single-ended electrical signal indicative of the angular position of the rotor shaft.

In some implementations, the transmitter and the receiver communicate with each other via low voltage differential signaling (LVDS).

In some implementations, the shaft angle sensor generates a plurality of single-ended electrical signals in response to rotation of the rotor shaft. Each single-ended electrical signal is converted to a corresponding differential pair of electrical signals to transmit from the sensor board to the machine control board via the electrical harness. Each differential pair of electrical signals received by the machine control board is converted to a single-ended electrical signal indicative of the angular position of the rotor shaft.

In some implementations, the shaft angle sensor uses quadrature encoding to generate a plurality of single-ended electrical signals including a first signal representing a first angular position of the rotor shaft, a second signal representing a different second angular position of the rotor shaft, and a third signal representing an index position of the rotor shaft.

In some implementations, the electronically controlled electric machine is configured to transmit additional electrical signals between the shaft angle sensor and the controller via the electrical harness. The additional electrical signals are digital signals pertinent to shaft angle sensor configuration or diagnostics. The additional electrical signals may include two or more signals transmitted between the controller and the shaft angle sensor. The additional electrical signals may be serial peripheral interface (SPI) signals communicated via low voltage differential signaling (LVDS).

In some implementations, the sensor board includes a transmitter that transmits the differential pair of signals to the machine control board, and the transmitter receives a supply voltage derived from a higher supply voltage provided by the machine control board. The supply voltage received by the transmitter may be monitored at the machine control board via the electrical harness.

In some implementations, the sensor target is a diametrically magnetized magnet.

In some implementations, the electrical harness is constructed as a flex circuit or ribbon cable.

In some implementations, a signal from at least one additional sensor within the casing of the rotating electric machine is provided to the control board via the sensor board and the electrical harness. The at least one additional sensor may include a temperature sensor or a current sensor. The at least one additional sensor may be powered by a supply voltage from the control board via the electrical harness and the sensor board, and the supply voltage may be a pass-through voltage relative to the sensor board. The at least one additional sensor may include a plurality of additional sensors electrically connected to the sensor board via a sensor harness and a common connector. The sensor harness may be at least partially constructed as a flex circuit or ribbon cable, the sensor harness may be affixed to the motor casing along a portion of the sensor harness between each additional sensor and the sensor board, and the sensor harness may include a stiffening portion bonded to a flat, flexible insulated conductor portion and be mounted to the casing via the stiffening portion.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

FIG. 7 is a simplified schematic of select portions of an illustrative power supply architecture of the RMPS system;

FIG. 8 is an isometric view of an illustrative sensor harness including a stiffening portion;

FIG. 9 is an isometric view of the sensor harness including a different stiffening portion;

DETAILED DESCRIPTION

Described below are embodiments of a rotating electric machine (REM) with a shaft angle sensor in communication with an external controller via differential signaling. This construction permits a machine controller to be located away from the axial end of the machine while reliably transmitting rotor angle or rotor speed information to the machine controller over a relatively long electrical harness. The rotating electric machine may be referred to as a rotary electric machine. As used herein, a rotating electric machine includes an electric motor, an alternator, a generator, or any other machine that converts energy between electrical energy and rotational motion in either direction.

Figure 1:
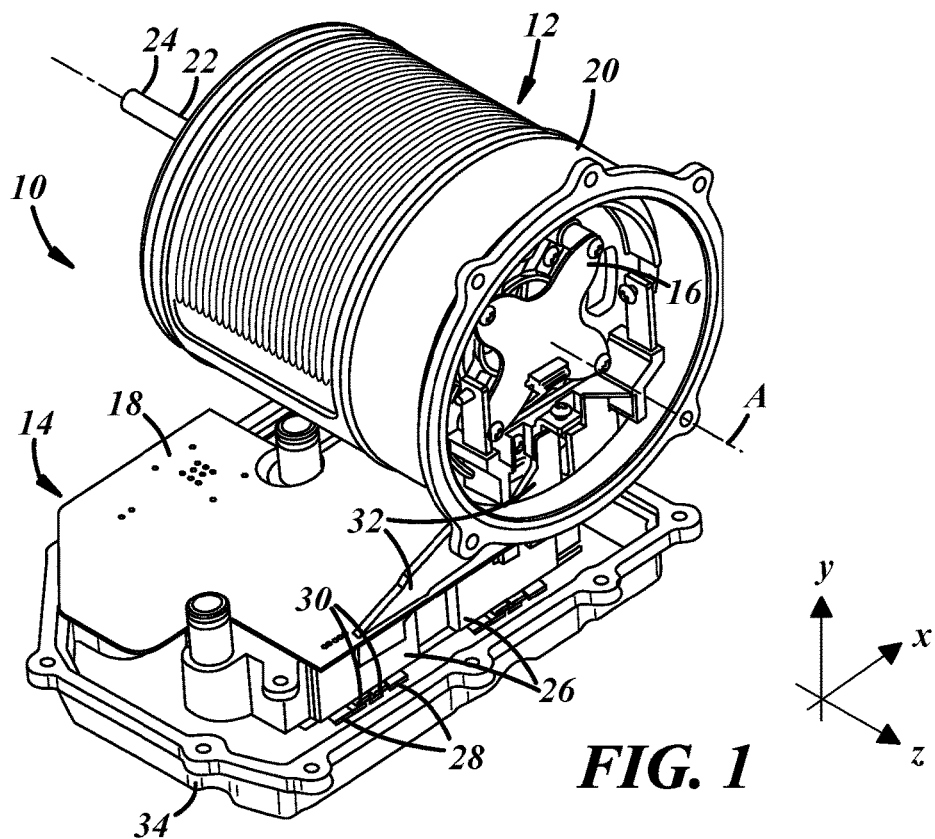
FIG. 1 is an isometric cut-away view of an embodiment of an electronically controlled electric machine including a rotating electric machine having a sensor board remote from an inverter that includes a control board.

FIG. 1 is an isometric cut-away view of a portion of an illustrative electronically controlled electric machine 10 including a rotating electric machine 12 and an inverter 14. In this example, the rotating electric machine 12 is an electric motor that coverts electricity to rotational motion and may also operate as a generator that converts rotational motion to electricity. While disclosed by way of example as machine 10 having an electric motor 12 with generator functionality, it should be understood that these teachings are equally applicable to other types of rotating electric machines. The illustrated electric motor 12 includes a sensor board 16, and the inverter 14 includes a machine control board 18. The connection between the sensor board 16 and control board 18 is omitted in FIG. 1 for clarity in describing the environment of a remote motor position sensor (RMPS) system.

The motor 12 includes a casing 20 that houses a stator (not shown) at a fixed position relative to the casing. The casing 20 rotatably supports a rotor (not shown) along a rotational axis A, which is also the central axis of the stator. The rotor includes a rotor shaft 22 having a drive end 24 protruding from the casing 20 and configured for coupling with a transmission or vehicle wheel where the machine 10 is part of a vehicle. In the example of FIG. 1, an outer portion of the casing 20 is cutaway to show an inner portion of the casing with coolant grooves. In one embodiment, the rotating electric machine 12 is a permanent magnet motor. In a more specific embodiment, the motor 12 is a multi-phase (e.g., three-phase) permanent magnet AC motor. However, the remote motor position sensor (RPMS) system described herein is applicable to any type of motor or electric machine where it is necessary to relay information from a sensor in the machine casing to an external location, including AC induction motors with any number of phases, DC motors and generators, and rotating electric machines with permanent magnet stators and/or wound rotors, to name a few examples.

The inverter 14 includes the machine control board 18 and a power module 26 for each electrical phase. In the illustrated example, the motor is a three-phase AC motor and includes three power modules 26 (only two are visible in FIG. 1). Each power module 26 includes power source connections 28 and bus bar connections 30. In this example, each power module 26 has a pair of power source connections 28 across which a voltage potential from a power source is applied—e.g., one power source connection 28 may be electrically connected to the cathode side of a DC power source (e.g., 48V, 400V, 800V) while the other power source connection of the same module 26 is connected to the anode side of the power source (e.g., ground or 0V). One or more bus bar connections 30 of each power module 26 are configured to be electrically connected with a bus bar 32 associated with the electrical phase of the respective power module. For example, the portion of the illustrated bus bars 32 extending below the control board 18 in FIG. 1 may extend to the illustrated bus bar connections 30, where they are welded or otherwise electrically attached. The power module ends of the bus bars 32 are truncated in FIG. 1 to better illustrate the connections 28, 30.

Figure 2:
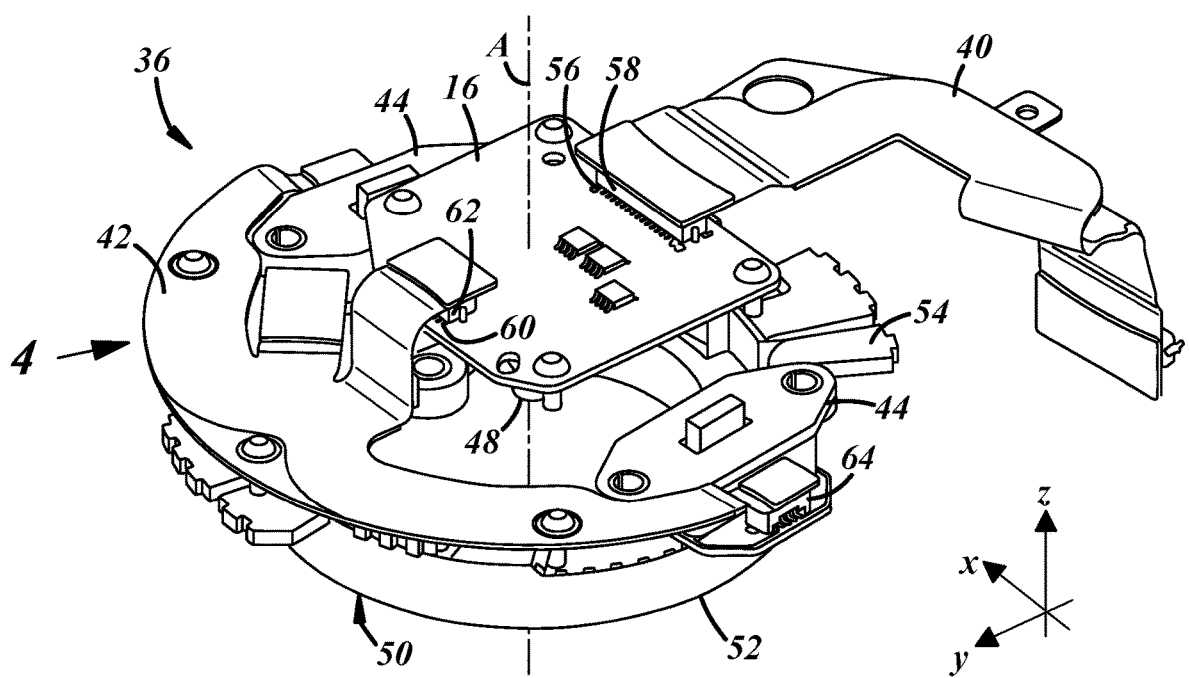
FIG. 2 is a perspective view of an axially outboard side of an embodiment of a remote motor position sensor (RMPS) system for use with a rotating electric machine such as that of FIG. 1.

Each power module 26 functions as a high-current, electronically controlled switch that controls current flow along the associated bus bar 32 from the power source or from ground. Current in each bus bar 32 can flow in either direction, depending where in the respective AC phase that signal needs to be relative to the other phases. A capacitor bank may be provided across the power source connections 28 to supply necessary surge currents as the power modules are switching under the control of the control module 18. In the illustrated embodiment, in which the inverter 14 is integrated with the motor 12 as part of the electric machine 10, the bus bars 32 each extend from their respective bus bar connections 30 at the corresponding power module and through the casing 20 of the rotating electric machine 12, where they are electrically connected with a corresponding phase of the stator via a bus bar assembly 50 (FIG. 2).

The inverter 14 may primarily operate to convert DC power from the power source to AC power for use by the motor 12. The inverter 14 and its control board 18 may also modulate or control other characteristics of the power it receives and transmits, including the amplitude, frequency, and/or phase timing of each electrical phase of the motor 12. The inverter 14 may also be configured to operate as a rectifier that converts AC power from the motor 12 to DC power for energy storage or for use by DC-powered devices.

The sensor board 16 is supported by the machine casing 20 at an end of the rotor shaft 22 opposite the drive end 24 and includes a shaft angle sensor (not shown in FIG. 1) configured to produce an electrical signal indicative of the angular position of the rotor shaft 22. The sensor board 16 is described in further detail below.

The control board 18 includes a controller configured to receive information pertinent to the operation of the motor 12 and/or power modules 26 and to control one or more operating parameters of the motor and/or inverter based on that information. The control board 18 may be referred to interchangeably as a machine control board or an inverter control board in the sense that it controls operation of the motor 12 via the inverter 14. Some of the information received by the controller is in the form of one or more electrical signals corresponding to the electrical signal produced by the shaft angle sensor of the sensor board 16. Where the machine 10 is part of a vehicle, the controller may be in communication with other vehicle controllers or components to receive various pieces of information such as a power demand for a vehicle accelerator, a braking demand, or other information pertinent to the operation of the motor 12. These examples are non-limiting. The control board 18 may include more than one controller and/or be considered itself as a multi-functional controller.

The control board 18 is supported by or adjacent to the power modules 26 away from the axial ends of the motor 12 and outside of the casing 20. In the illustrated example, the inverter 14 and its control board 18 are located radially outboard of the machine casing 20. At least a portion of the inverter 14 and/or its control board 18 is located between opposite axial ends of the motor 12 and casing 20. No part of the inverter 14 or its control board 18 is located along the motor axis A or within the axially projected area of the machine casing 20. The illustrated control board 18 is a printed circuit board (PCB) with integrated circuits and/or other electronics mounted and electrically interconnected thereon. The control board 18 may take other forms, such as a flex circuit form.

The inverter 14, sensor board 16, electrical connections between the sensor and control boards, electrical connections between the motor 12 and inverter, and at least a portion of the motor may be enclosed together in a housing 34 to form the electronically controlled electric machine 10. A portion of the housing 34 is omitted in FIG. 1 and may include a cover for the inverter 14, for example. The housing 34 forms the external surfaces of the machine 10 and may include a portion of the casing 20, while other portions of the casing 20 are internal to the housing 34. The housing may also provide at least a portion of an inverter heat sink.

Figure 3:
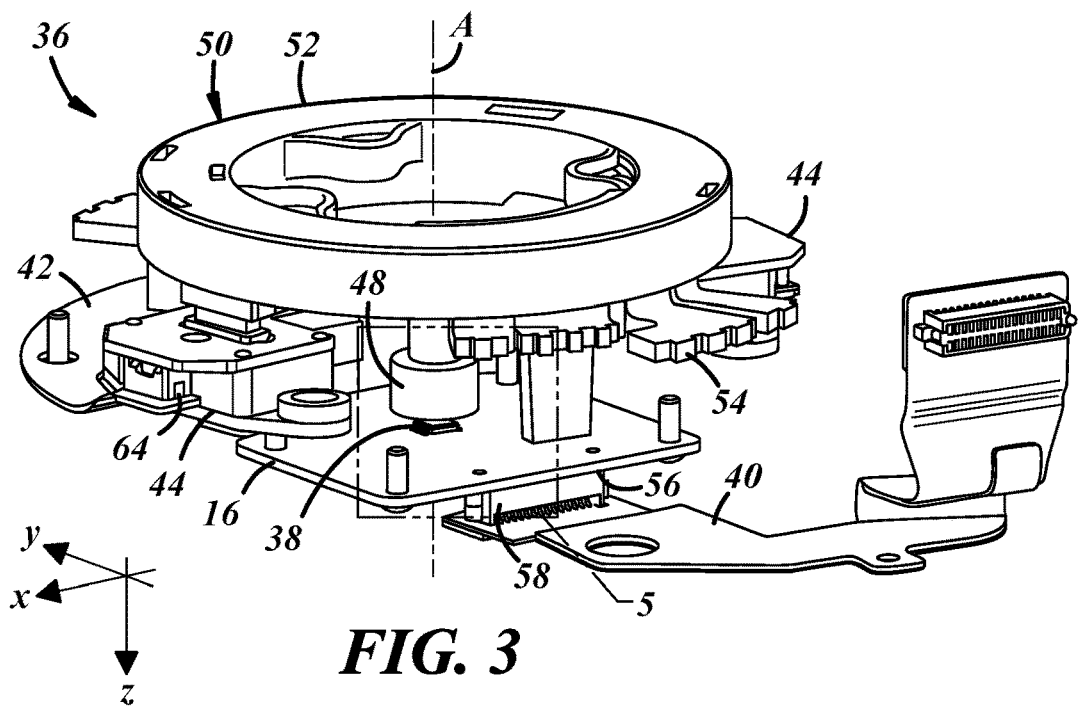
FIG. 3 is a perspective view an inboard side of the RMPS system of FIG. 2.
Figure 4:
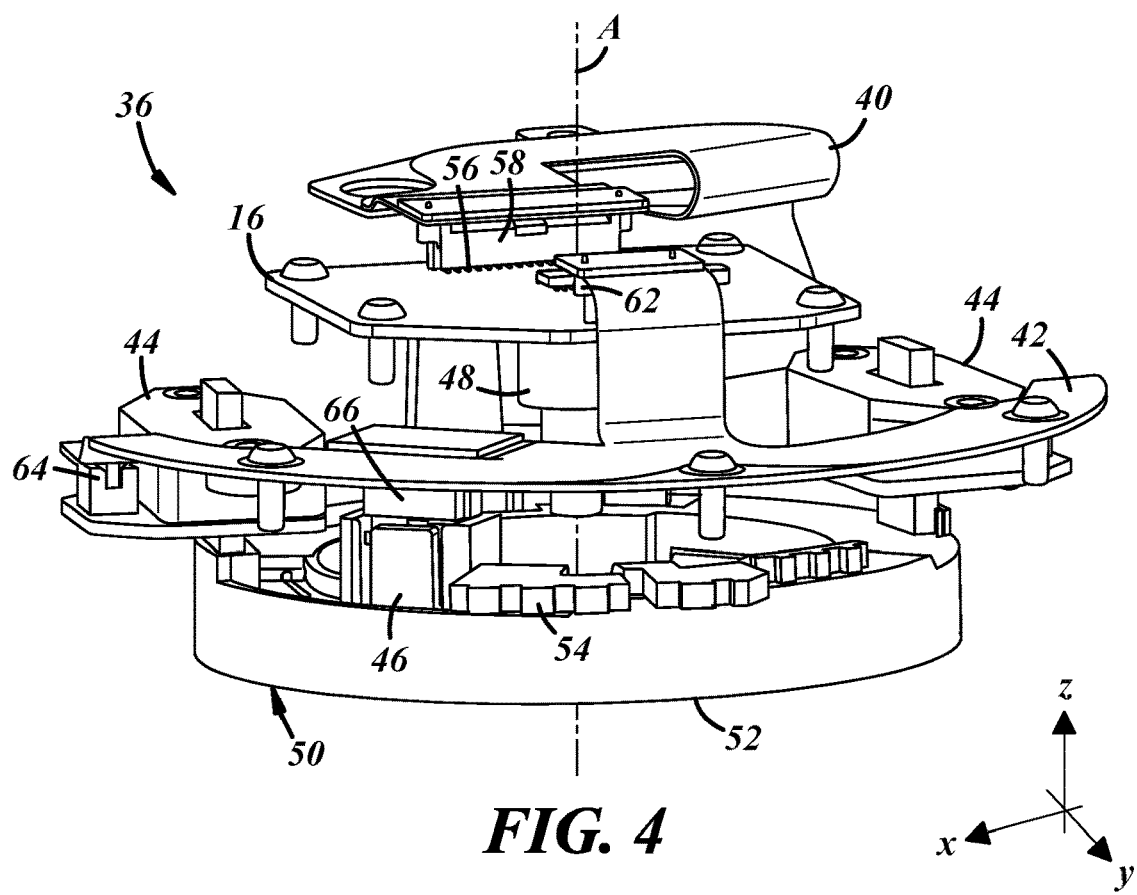
FIG. 4 is a perspective view the RMPS system of FIG. 2 from vantage point 4 of FIG. 2.

FIGS. 2-4 are perspective views of portions of an illustrative remote motor position sensor (RMPS) system 36 suitable for use with the motor 12 and inverter 14 of FIG. 1. As used here, "remote" means the shaft angle sensor is located in the motor casing 20 or otherwise remotely from the inverter 14 and its control board 18. A reference coordinate system is provided in FIGS. 1-4 to indicate the intended orientation of the sensor system 36 relative to the motor 12. FIG. 2 is a view of an axially outboard side of the system 36, FIG. 3 is a view of an axially inboard side of the system, and FIG. 4 is a view of from vantage point 4 of FIG. 2. The RMPS system 36 includes the sensor board 16 carrying a rotor position or shaft angle sensor 38 (FIG. 3), an electrical harness 40 for interconnecting the sensor board 16 with the control board 18 of the inverter 14, and an optional sensor harness 42 for connecting one or more additional sensors with the sensor board.

As used herein, a harness is any flexible collection of two or more elongate electrical conductors electrically insulated from one another along their lengths with each conductor ending at a common connector at each end. The conductors and insulation may be bundled together so that the harness can be handled as one piece. "Flexible" means the harness can be bent along its length without losing functionality. A harness may include a bundle of individually insulated copper wires between the connectors. In some embodiments, the harness includes a plurality of individually insulated wires arranged and bonded together in a flat configuration as a flexible flat cable or ribbon cable. In other embodiments, the harness is constructed in the manner of a flexible printed circuit (FPC) or flex circuit, with wire or printed conductors encased in a flexible polymer insulator (e.g., polyimide). A flex circuit construction may include multiple layers of conductors and insulator material. Each harness may also include one or more shielding layers (e.g., metal foil).

The additional sensors may include sensors for monitoring parameters of the rotating electric machine 12 other than the shaft angle. In this example, the additional sensors include a pair of phase current sensors 44 and one or more temperature sensor assemblies 46 (FIG. 4). The system 36 may further include the control board 18 or one or more components mounted on the control board to the extent those components are required for operation of the RMPS system. The additional sensors may produce analog signals that are transmitted to the control board 18 in analog form, analog signals converted to digital signals before transmission to the control board, or digital signals that are transmitted to the control board as digital signals.

FIGS. 2-4 also illustrate portions of the motor 12 that interact with RMPS system components, including a non-drive end 48 of the rotor shaft 22 opposite the drive end 24 (FIG. 1) and a bus bar assembly 50. The bus bar assembly includes a housing 52 and a bus bar 54 for each stator phase. A portion of each bus bar 54 is encased in the housing 52, and a portion of each bus bar 54 extends from an upper side of the housing to be electrically connected with the bus bars 32 extending from the inverter 14. The bus bars 54 may be electrically connected with their respective stator windings at an outboard side of the housing 52.

In this example, portions of two of the three bus bars 54 extend through openings of the phase current sensors 44 on their way to the power modules 26, and the temperature sensor 46 is housed in the bus bar assembly 50. Each of the one or more temperature sensor assemblies 46 may include one or more temperature sensor (e.g., a thermistor). In one implementation, a temperature sensor assembly 46 includes a plurality (e.g., two or more) sensors configured to measure internal temperatures of the bus bar assembly 50 at different locations. Temperature sensors may be located at and configured to measure the temperature of stator windings, the stator core, casing 20, or other internal components of the motor 12.

The sensor board 16 is configured to be mounted to or otherwise supported by the motor casing 20 (FIG. 1) and includes the shaft angle sensor 38 and a connector 56. The sensor board 16 can be mounted to the motor casing by fasteners, as shown, or any other suitable means. The shaft angle sensor 38 is mounted on the inboard side of the board and located along the motor axis A when the board 16 is mounted to the motor casing. The connector 56 is configured to receive a mating connector 58 of the electrical harness 40 leading to the control board 18. The illustrated sensor board 16 is a printed circuit board (PCB) with integrated circuits and/or other electronics mounted and electrically interconnected thereon. The sensor board 16 may take other forms, such as a flex circuit form, or may be integrated with the electrical harness 40 in FPC form with no separable connectors 56, 58.

Where the system 36 includes additional sensors in communication with the sensor board 16, an additional connector 60 is provided on the sensor board 16 to receive a mating connector 62 of the sensor harness 42. In this example, the sensor harness 42 includes the mating connector 62 for the sensor board connector 60, a pair of current sensor connectors 64, and a temperature sensor connector 66. The electrical wires or other conductors from each of the sensor connectors 64, 66 all lead to the mating connector 62 to be connected to the sensor board 16 via one common connector 62. As with the electrical harness 40 connecting the sensor board 16 with the inverter 14, the sensor harness 42 may be constructed as one or more bundles of individual wires, individual wires bonded together in a flat configuration (e.g., ribbon cable), or with a flex circuit (FPC) construction.

Figure 5:
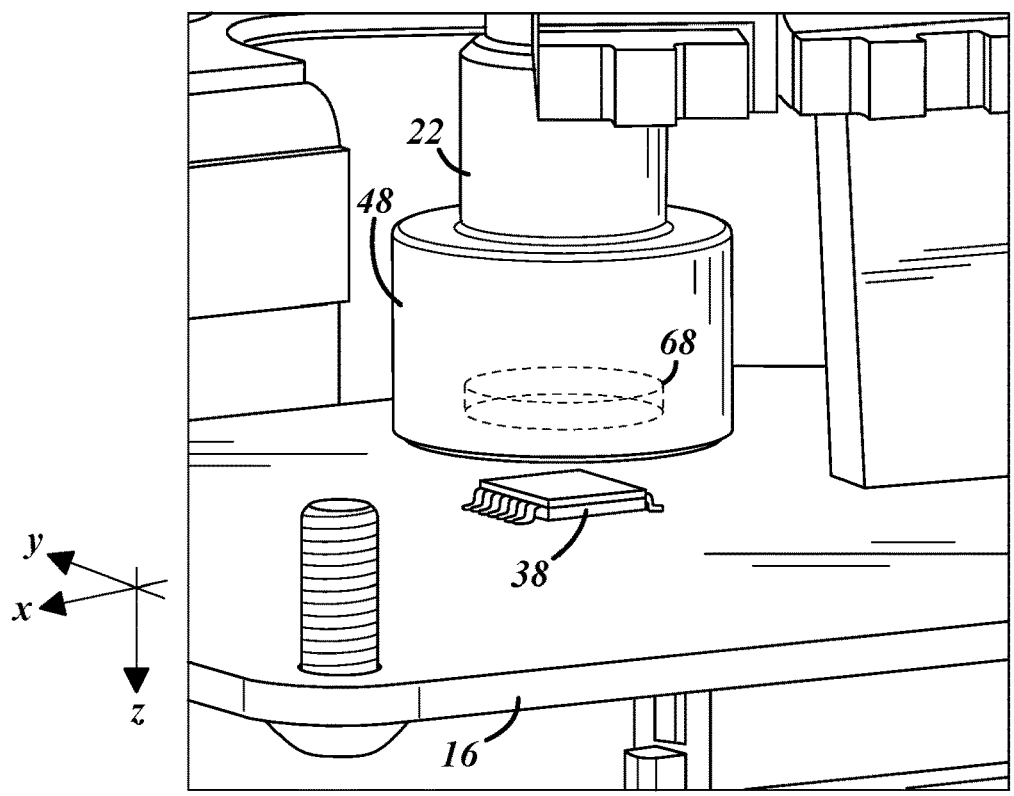
FIG. 5 is an enlarged view of a portion of FIG. 3.

FIG. 5 is an enlarged view of a portion of FIG. 4 illustrating the sensor board 16 and shaft angle sensor 38 in relation to the non-drive end 48 of the rotor shaft 24. In this example, the non-drive end 48 of the rotor shaft is provided by a non-ferromagnetic housing (e.g., aluminum, copper, plastic, etc.) in or on which a magnetic sensor target 68 is mounted. The sensor target housing may be coupled with a main portion of the rotor shaft which supports the magnetic poles of the rotor and which is rotatably supported by the machine casing 20. The target housing may be press-fit onto or otherwise affixed to a steel portion of the rotor shaft, for example. The depth of such a press fit can provide a controllable manufacturing process variable affecting an air gap between the end 48 of the rotor shaft and the shaft angle sensor 38.

The illustrated shaft angle sensor 38 is a non-contact sensor. One example of a non-contact sensor is a Hall effect sensor, which is configured to detect the presence of and/or changes in a nearby magnetic field. The sensor target 68 may be a diametrically magnetized magnet—i.e., a magnet with opposite poles across the its diameter. The polarity of the magnet 68 can be correlated to an angular position of the rotor shaft 22 so that an analog or digital signal from the shaft angle sensor 38 is indicative of the angular position of the rotor shaft and rotor of the rotating electric machine 12. Other types of shaft angle sensors are contemplated, including but not limited to inductive or optical sensors.

In some implementations, the shaft angle sensor 38 uses quadrature encoding to generate a plurality of single-ended electrical signals, including a first signal representing a first angular position of the rotor shaft, a second signal representing a different second angular position of the rotor shaft, and a third signal representing an index position of the rotor shaft. As used here, each "angular position" of the rotor shaft is represented by a discrete angular step resolved by the shaft angle sensor. For example, the first, second, and third signals may be provided by the shaft angle sensor 38 at respective A, B, and I (or Z) terminals of an ABI-capable sensor. With quadrature encoding, the edges of each generated signal represent the angular steps of rotor shaft rotation. In one implementation, the shaft angle sensor 38 is configured to resolve 4096 discrete angular steps (i.e., 0.08789° per step). Each of the A signal and the B signal has 2048 edges per revolution of the rotor shaft. The A and B signals are interlaced so that an A edge is half-way between two B edges, and vice versa. The direction of rotation of the rotor shaft can thereby be determined based on the relative order in which the two signals (A and B) rise and fall.

In one embodiment, the shaft angle sensor 38 is an integrated circuit with on-board analog-to-digital processing which can produce a digital signal for every rotation or half-rotation of the sensor target 68, for example, with a signal frequency proportional to the rotational speed of the motor 12. The signals generated by the shaft angle sensor 38 and transmitted to the control board 18 are preferably ABI signals—i.e., quadrature encoding with index. ABI signals can provide much faster transmission of rotor shaft angle to the processer 70 than other types of signals (e.g., SPI) because the controller need only count the "edges" of the received signal, with each edge representing a known angular position of the shaft. SPI signals may suffer from latency and require more time to send shaft angle information, which can be problematic at high motor speeds. Digital SPI signals may be useful for initial system configuration and/or diagnostics.

Sending electrical signals from the shaft angle sensor 38 to the control board 18 over any appreciable length of electrical cabling can be problematic in the illustrated environment. This is due in part to conventional shaft angle sensors producing an analog or a single-ended digital signal. The combination of a high-frequency single-ended signal and the electromagnetically noisy environment can lead to an inaccurate or compromised signal being received at the control board 18.

To counteract or eliminate such signal degradation, the RMPS system 36 may be configured to convert at least one electrical signal produced by the shaft angle sensor 38 to a differential pair of signals at the sensor board 16 before the signals are transmitted to the control board 18. The conversion may include generating a second signal complimentary to the original sensor signal (e.g., an inverse signal) that is then paired with the original signal in two distinct conductors such that the potential between the pair of signals is independent from the common ground of a single-ended signal. Once received at the control board 18, each differential pair of signals can be converted to a corresponding single-ended signal based on the potential between the pair of signals that is indicative of the angular position of the rotor shaft 22. That information can be further processed at the control board 18 for use by the controller in controlling operation of the motor 12. For example, information from the shaft angle sensor may be used by the controller of the control board in a control algorithm to properly pulse width modulate each of the power modules 26 to generate multi-phase power signals for the corresponding stator windings to achieve the desired torque or speed output of the rotor when the machine 12 is operating as a motor, or to apply the desired negative torque to the rotor when the machine 12 is operating as a generator.

Figure 6:
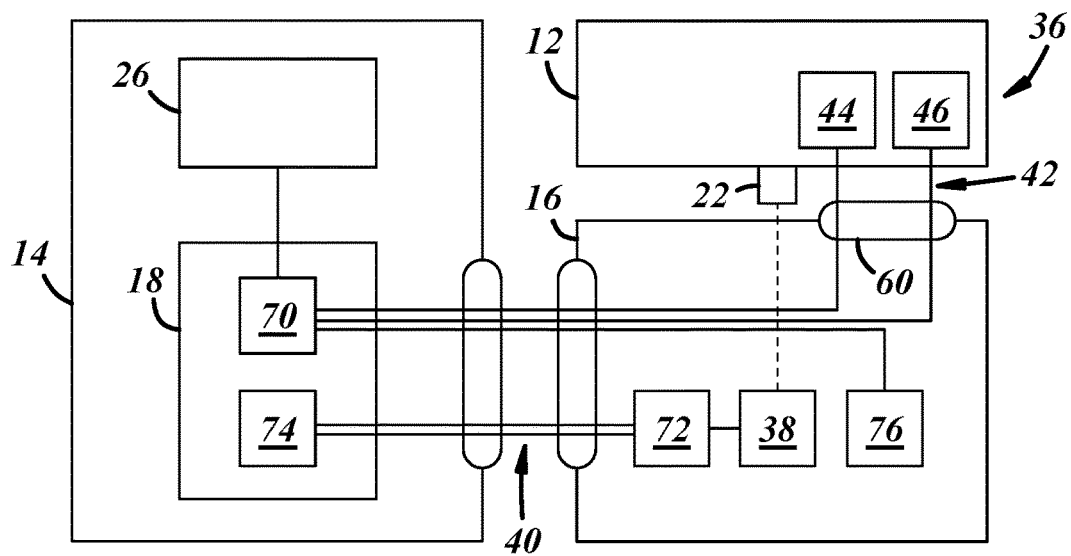
FIG. 6 is a simplified schematic of select portions of the electronically controlled electric machine, including a shaft angle sensor in communication with the control board via differential signaling.

FIG. 6 is a simplified schematic illustrating select components of the inverter 14, sensor board 16, and RMPS system 36. The sensor board 16 includes the shaft angle sensor 38 in magnetic communication with the non-drive end of the rotor shaft 22 of the motor 12 (e.g., via a sensor target in a housing portion of the shaft), and the control board 18 includes a controller 70 in communication with the power module(s) 26. The sensor board 16 includes a transmitter (also referred to as a differential line driver) 72, and the control board 18 includes a receiver (also referred to as a differential receiver) 74. The transmitter 72 is configured to convert a single-ended signal from the shaft angle sensor 38 to a differential pair of signals for transmission to the receiver 74, and the receiver is configured to convert the received differential signal back to a single-ended signal to be provided to the controller 70. One or both of the transmitter 72 and receiver 74 may be in the form of a transceiver capable of both transmission and reception of electrical signals.

The transmitter and receiver 72, 74 may employ a low-voltage differential signaling (LVDS) protocol, such as TIA/EIA-485, TIA/EIA-644, CAN (Controller Area Network), FlexRay, or derivatives thereof. Some implementations employ a dual-driver/dual-receiver set of transmitters and receivers. In one implementation, the transmitter 72 receives a plurality of electrical signals from the shaft angle sensor 38 and converts those signals to a corresponding plurality of differential pairs of signals to transmit to the control board 18. For example, an ABI-capable sensor may generate three distinct but related signals at respective A, B, and I (or A, B, and Z) terminals of the shaft angle sensor 38, which the transmitter 72 converts to three corresponding pairs of differential signals to send to the control board 18. The two signals of each differential signal pair are transmitted through the electrical harness 40 in physically adjacent conductors. A digital ground signal may also be provided to the control board via the electrical harness 40. Other differential signaling protocols are possible, and the sensor and control boards 16, 18 may include other components through which the signals pass (e.g., A/D converters, amplifiers, processors, etc.).

In the example of FIG. 6, the sensor board 16 acts as a hub for other motor sensors, including the phase current sensors 44 and one or more temperature sensors 46 (e.g., stator winding temperature, machine casing 20 temperature, bus bar assembly 50 temperature, etc). Signals from these and other motor sensors may be relayed to the control board 18 as pass-through signals via the sensor board 16 and electrical harness 40. Here, all of the additional sensor signals are received at the sensor board 16 via the same sensor harness 42 and sensor board connector 60, passed through the sensor board 16 (e.g., via traces), and passed through the same electrical harness 40 as the differential pairs of shaft angle sensor signals to the control board 18. This eliminates the electrical wiring conventionally extending from individual motor sensors to the inverter 14, resulting in lower weight, lower cost, and less required packaging space within the overall machine 10. FIG. 6 also illustrates an on-board temperature sensor 76 configured to monitor sensor board temperature and to communicate with the control board 18 via the same electrical harness 40 as the other sensors. In one implementation, the on-board temperature sensor is a negative temperature coefficient (NTC) thermistor. In another implementation, the shaft angle sensor 38 includes an integrated temperature sensor communicated as a value (parameter) within an SPI data packet.

In some implementations, the electronically controlled electric machine 10 is configured to transmit and receive additional electrical signals between the shaft angle sensor 38 and the controller 70 via the electrical harness 40. These additional electrical signals may be digital signals pertinent to shaft angle sensor 38 configuration and/or diagnostics. In one example, the additional signals include at least one signal transmitted from the shaft angle sensor 38 to the controller 70 and at least one signal transmitted from the controller 70 to the shaft angle sensor 38. For instance, an inter-integrated circuit (I2C) protocol may be implemented that uses only two wires for bi-directional communication between the shaft angle sensor 38 and the controller 70. In another implementation, the additional signals include two or more signals (e.g., CLK and MOSI) transmitted from the controller 70 to the shaft angle sensor 38 and one or more signal (e.g., MISO) transmitted from the shaft angle sensor to the controller. In one particular example, the additional electrical signals include three signals transmitted from the controller 70 to the shaft angle sensor 38 (e.g., CS, CLK, MOSI) and one signal transmitted from the shaft angle sensor 38 to the controller (e.g., MISO). These signals may be serial peripheral interface (SPI) signals and communicated between the sensor board 16 and control board 18 via LVDS in the same manner as the signals that are indicative of the rotor shaft angle.

Shaft angle information may be communicated between the shaft angle sensor 38 and the controller 70 via SPI signals at start-up. At that time, ABI shaft angle information is not available until the sensor target 68 has rotated enough to generate the index (I) pulse. Once the index pulse is generated, the controller 70 may thereafter rely on the ABI signals to determine shaft angle while ignoring the angle-specific SPI signals for purposes of motor control. As part of diagnostics and fault detection, the controller 70 may be configured to compare SPI-reported shaft angle to ABI-reported shaft angle (e.g., via edge counting) to make sure there is a substantial match. If the two reported shaft angles differ by more than a predetermined angle a fault indication may be provided and remedial action (e.g., stopping the motor) can be taken.

The LVDS devices 72, 74 may operate at a lower supply voltage than the shaft angle sensor 38, controller 70, and other components of the system 36. FIG. 7 is a simplified schematic of an illustrative power supply architecture. The illustrated sensor board 16 includes a regulator or low voltage power supply 78 that receives nominal power (e.g., 5V) from a control board power supply 80 and supplies the transmitter(s) 72 with a lower voltage (e.g., 3.3V). The control board 18 may also include a step-down regulator (not shown) to supply the control board receiver 74. On-board regulation of the supply voltage for the sensor board transmitter 72 permits use of a single power supply line from the control board 18 to the sensor board 16 to power the shaft angle sensor 38, transmitter 72, and other sensor board components. In other implementations, the low voltage supply to the sensor board transmitter 72 is transmitted through the electrical harness from a low voltage power supply on the control board 18, such as from the same low voltage power supply powering the LVDS receiver 74 on the control board.

As illustrated, the input and output voltages of the low voltage power supply 78 supply may be monitored at the control board 18 to verify proper operation, with each of the input and output voltages sent to the control board via the same electrical harness 40 as the sensor signals. This arrangement can recognize if the input voltage signal from the control board 18 to the power supply 78 has encountered any problem during initial transmission through the electrical harness 40. In another implementation, the input voltage of the low voltage power supply 78 is monitored at the control board 18.

In the illustrated example, the sensor board 16 further acts as a power supply hub for the phase current sensors 44 and/or other additional sensors that are remote from the sensor and control boards 16, 18. Power from a control board power supply 82 reaches the sensors 44 through the electrical harness 40, the sensor board 16, and the sensor harness 42. An analog-to-digital converter 84 receives reference voltages from the two power supplies 80, 82 and from the low voltage power supply 78 to permit the board controller 70 to monitor the power supplied to the various components. As illustrated, the power supply 82 powering the additional motor sensors may be capacitively decoupled at the sensor board 16. Similarly, the power supply 80 powering the low voltage power supply 78 may be capacitively decoupled at the sensor board 16 (not shown). In yet another implementation, the same power supply of the control board 18 powers both the shaft angle sensor 38 (via the regulator 78) and the additional sensors (current sensors 44 in this case).

FIGS. 8 and 9 illustrate implementations of the sensor harness 42, each of which includes a flat, flexible insulated conductor portion 86 and a stiffening portion 88. The insulated conductor portion 86 may be a ribbon cable or constructed as a flex circuit as described above. The stiffening portion 88 includes one or more segments 90 of a rigid or semi-rigid material affixed to the flexible portion 86 to provide rigidity to the sensor harness 42 where desired and/or to provide mounting features 92 for attaching the sensor harness 42 to the casing 20. Each segment 90 may be referred to as a stiffener and may be metal, plastic, composite, fiber board, or other suitably rigid material and can help reliably maintain the position of the sensor harness 42 on the machine casing 20 by preventing the otherwise flexible harness from moving when subject to vibration and other forces during use of the machine 10. Each stiffener 90 may be bonded to the flexible portion 86 via adhesive or other suitable means. Some of the stiffeners 90 are located at the connectors 62, 64 to prevent bending at the solder pads where the connectors are joined to the wires or conductors of the sensor harness 42.

The illustrated mounting features 92 are apertures formed through the stiffening portion 88 sized for threaded fasteners to pass through to engage threads of the motor casing 20 and sized to provide clearance for compression-limiting features of the motor casing to extend through for controlled clamping of the stiffening portion to the motor casing. Other types of mounting features 92 (e.g., snap features) are contemplated. In some implementations the mounting features are simply additional surface area to be clipped or adhered to the motor casing.

The stiffening portion 88 of FIG. 8 includes six stiffeners 90: three with mounting features 92, one at the sensor board connector 62, and two at the current sensor connectors 64. The stiffeners 90 with mounting features provide only localized stiffening of the sensor harness 42. This low-weight option may be used in applications where flexibility of the sensor harness 42 is necessary or of little concern between the mounting features 92.

The stiffening portion 88 of FIG. 9 includes four stiffeners 90 with the mounting features 92 in the same locations as in FIG. 8. The four stiffeners 90 include: one along a majority of the sensor harness 42 with all three mounting features 92, one at the sensor board connector 62, and two at the current sensor connectors 64. This implementation provides additional stiffness between mounting features 92, which are all located along one large stiffener 90 to prevent the otherwise flexible harness from moving during use. Only the portions of the sensor harness 42 near the connectors 62, 64 remain flexible to eliminate any need for tight tolerances of the positions of the connectors.

Figure 10:
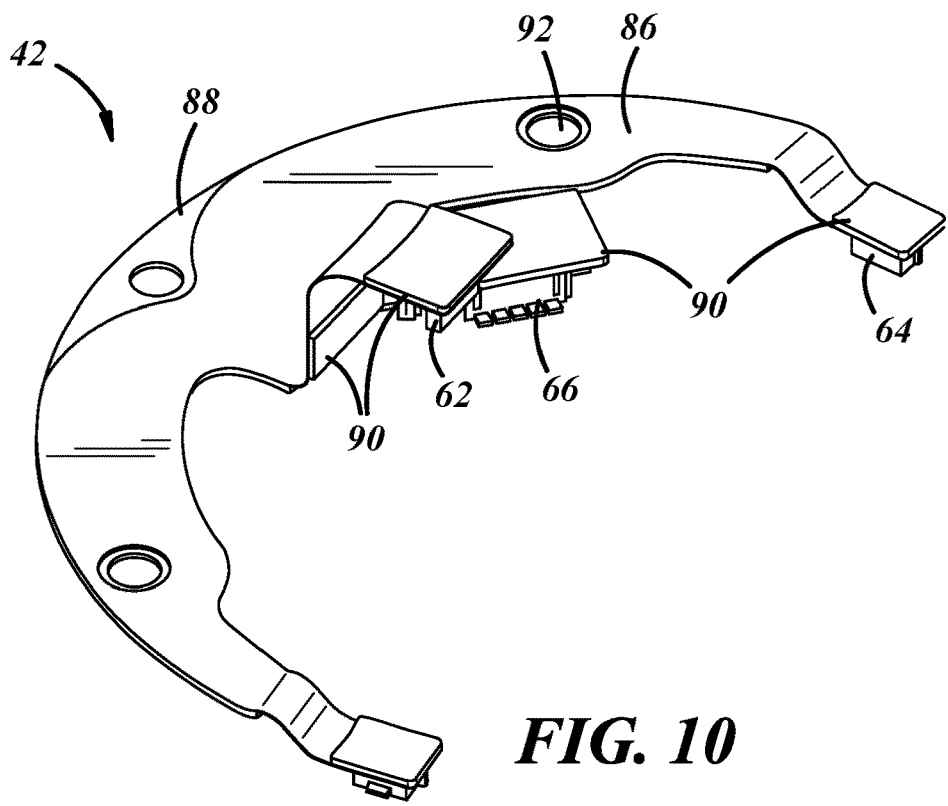
FIG. 10 is a perspective view of an outboard side of the sensor harness of FIGS. 2-4.
Figure 11:
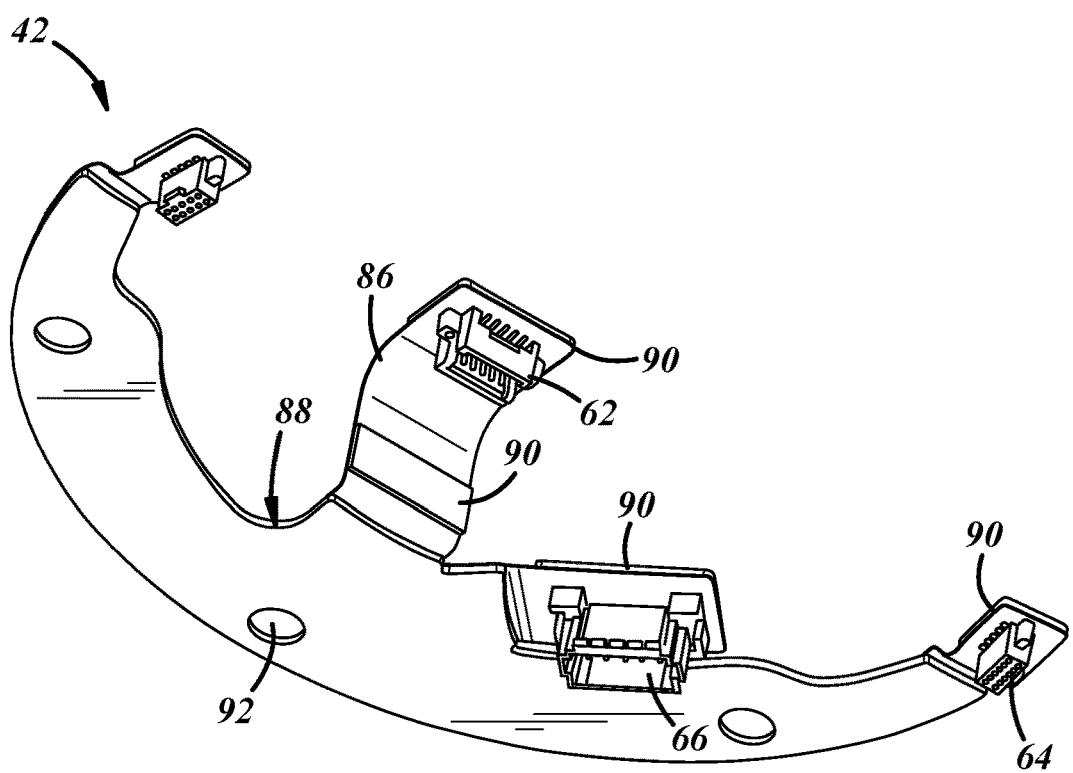
FIG. 11 is a perspective view of an inboard side of the sensor harness of FIG. 10.

FIGS. 10 and 11 are respective top and bottom views of the sensor harness 42 of FIGS. 2-4. In this implementation, the stiffening portion 88 includes a total of six stiffeners 90: one large C-shaped stiffener including the three mounting features 92, one backing the sensor board connector 62, two backing the current sensor connectors 64, one backing the temperature sensor connector 66, and optionally one on the flexible portion 86 of the sensor harness 42 between the large stiffener and the sensor board connector 62, used here to protect the flexible portion of the cable from an unrelated mounting feature in the motor casing. This example provides a high degree of stiffening with flexibility maintained only where necessary near the connectors 62, 64, 66. The large stiffener 90 is mounted along the bottom side (i.e., inboard with respect to the motor) of the flexible portion 86. However, in an alternative implementation, it may be advantageous to reverse the topology. For example, this could be advantageous if the stiffener includes electrically or electro-magnetically conductive material (e.g. steel, stainless steel, aluminum) and used to provide additional noise shielding of the conductive pathways electrically bonded to the casing through the mounting features. The flexible portion 86 in this example includes through-openings 92 sized larger than the apertures 92 of the underlying stiffener 90 to provide surface area on the stiffener for the head of a fastener to controllably clamp against.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An electronically controlled electric machine, comprising:
    a rotating electric machine comprising a casing and a rotor shaft rotatably supported by the casing, the rotor shaft having a drive end and an opposite end;
    a sensor target mounted on said opposite end of the rotor shaft;
    a sensor board supported by the casing and comprising a shaft angle sensor positioned at said opposite end of the rotor shaft and configured to generate an electrical signal in response to movement of the sensor target relative to the shaft angle sensor;
    a machine control board located outside the casing and comprising a controller; and
    an electrical harness interconnecting the sensor board and the machine control board, wherein the electrical harness transmits from the sensor board to the machine control board a differential pair of electrical signals corresponding to the electrical signal generated by the shaft angle sensor,
    wherein the shaft angle sensor generates a plurality of digital single-ended electrical signals comprising ABI signals and SPI signals in response to rotation of the rotor shaft, each single-ended electrical signal being converted to a corresponding differential pair of electrical signals to transmit from the sensor board to the machine control board via the electrical harness, and each differential pair of electrical signals received by the machine control board being converted to a corresponding single-ended electrical signal indicative of the angular position of the rotor shaft,
    wherein shaft angle information is communicated between the shaft angle sensor and the controller via the SPI signals at start-up of the rotating electric machine and until an index pulse is generated, and wherein the controller relies on the ABI signals to determine shaft angle and ignores the SPI signals for purposes of rotating electric machine control after the index pulse is generated.

2. The electric machine of claim 1, further comprising an inverter that includes the machine control board, the inverter further comprising power modules in communication with the controller to modulate phase voltages supplied to the rotating electric machine based in part on the electrical signals generated by the shaft angle sensor.

3. The electric machine of claim 1, wherein the sensor board comprises a transmitter that converts each single-ended electrical signal generated by the shaft angle sensor to the corresponding differential pair of electrical signals, and wherein the machine control board comprises a receiver that converts each received differential pair of electrical signals to the corresponding single-ended electrical signal indicative of the angular position of the rotor shaft.

4. The electric machine of claim 3, wherein the transmitter and the receiver communicate with each other via low voltage differential signaling (LVDS).

5. The electric machine of claim 1, wherein the shaft angle sensor uses quadrature encoding to generate the single-ended ABI signals, each ABI signal including a first signal representing a first angular position of the rotor shaft, a second signal representing a different second angular position of the rotor shaft, and a third signal representing an index position of the rotor shaft, the index pulse being the third signal.

6. The electric machine of claim 1, further configured to transmit additional electrical signals between the shaft angle sensor and the controller via the electrical harness, the additional electrical signals being digital signals pertinent to shaft angle sensor configuration or diagnostics.

7. The electric machine of claim 6, wherein the additional electrical signals comprise two or more signals transmitted between the controller and the shaft angle sensor.

8. The electric machine of claim 6, wherein the additional electrical signals are serial peripheral interface (SPI) signals communicated via low voltage differential signaling (LVDS).

9. The electric machine of claim 1, wherein the sensor board comprises a transmitter that transmits the differential pair of signals to the machine control board, the transmitter receiving a supply voltage derived from a higher supply voltage provided by the machine control board.

10. The electric machine of claim 9, wherein the supply voltage received by the transmitter is monitored at the machine control board via the electrical harness.

11. The electric machine of claim 1, wherein the sensor target is a diametrically magnetized magnet.

12. The electric machine of claim 1, wherein the electrical harness is constructed as a flex circuit or ribbon cable.

13. The electric machine of claim 1, wherein a signal from at least one additional sensor within the casing of the rotating electric machine is provided to the control board via the sensor board and the electrical harness.

14. The electric machine of claim 13, wherein the at least one additional sensor comprises a temperature sensor or a current sensor.

15. The electric machine of claim 13, wherein the at least one additional sensor is powered by a supply voltage from the control board via the electrical harness and the sensor board, the supply voltage being a pass-through voltage relative to the sensor board.

16. The electric machine of claim 13, wherein the at least one additional sensor comprises a plurality of additional sensors electrically connected to the sensor board via a sensor harness and a common connector.

17. The electric machine of claim 16, wherein the sensor harness is at least partially constructed as a flex circuit or ribbon cable.

18. The electric machine of claim 16, wherein the sensor harness is affixed to the motor casing along a portion of the sensor harness between each additional sensor and the sensor board.

19. The electric machine of claim 16, wherein the sensor harness comprises a stiffening portion bonded to a flat, flexible insulated conductor portion and is mounted to the casing via the stiffening portion.

20. The electric machine of claim 1, wherein the sensor board is a printed circuit board and the shaft angle sensor is an integrated circuit of the printed circuit board, the sensor being axially spaced from the opposite end of the rotor shaft.

* * * * *